United States Patent
Yoon

(10) Patent No.: US 10,256,655 B2
(45) Date of Patent: Apr. 9, 2019

(54) WIRELESS CHARGING CONTROL METHOD, AND WIRELESS POWER TRANSMISSION APPARATUS AND WIRELESS POWER RECEIVING APPARATUS USING THE SAME

(71) Applicant: Samsung Electro-Mechanics Co., Ltd., Suwon-si (KR)

(72) Inventor: Young Seok Yoon, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 14/959,535

(22) Filed: Dec. 4, 2015

(65) Prior Publication Data
US 2016/0172893 A1    Jun. 16, 2016

(30) Foreign Application Priority Data

Dec. 15, 2014    (KR) .................. 10-2014-0180663

(51) Int. Cl.
*H02J 7/00* (2006.01)
*H02J 7/02* (2016.01)
(Continued)

(52) U.S. Cl.
CPC .............. *H02J 7/025* (2013.01); *H02J 5/005* (2013.01); *H02J 50/12* (2016.02); *H02J 50/80* (2016.02);
(Continued)

(58) Field of Classification Search
CPC .. H02J 7/025; H02J 17/00; H02J 5/005; H02J 50/12; H02J 50/40; H02J 2007/0096;
(Continued)

(56) References Cited

U.S. PATENT DOCUMENTS 9,537,352 B2 *   1/2017   Lee ....................... H02J 17/00
9,660,478 B2 *   5/2017   Von Novak ............ H02J 7/025
(Continued)

FOREIGN PATENT DOCUMENTS

CN    103715780 A     4/2014
KR    10-0331670 B1   4/2002
(Continued)

OTHER PUBLICATIONS

Chinese Office Action dated Sep. 4, 2017 issued in corresponding Chinese Patent Application No. 2015109318584. (19 pages in English and 14 pages in Chinese).

*Primary Examiner* — Helen Rossoshek
(74) *Attorney, Agent, or Firm* — NSIP Law

(57) ABSTRACT

A wireless power transmission apparatus includes: a resonance circuit configured to be magnetically coupled to a wireless power receiving apparatus; a wireless communicator configured to form a near field communications channel with the wireless power receiving apparatus; and a cross controller configured to determine whether the wireless power receiving apparatus is cross-connected to the wireless power transmission apparatus based on first identification information received from the wireless power receiving apparatus through the resonance circuit and second identification information received from the wireless power receiving apparatus through the wireless communicator.

19 Claims, 6 Drawing Sheets

(51) Int. Cl.
  *H02J 5/00* (2016.01)
  *H04B 5/00* (2006.01)
  *H02J 50/12* (2016.01)
  *H02J 50/80* (2016.01)
  *H02J 50/40* (2016.01)

(52) U.S. Cl.
  CPC ......... *H04B 5/0031* (2013.01); *H04B 5/0037* (2013.01); *H02J 50/40* (2016.02); *H02J 2007/0096* (2013.01)

(58) Field of Classification Search
  CPC ....... H02J 50/80; H04B 5/0037; H04B 5/003; H04B 5/0075; H01F 38/14
  See application file for complete search history.

(56) References Cited

U.S. PATENT DOCUMENTS

| | | | | |
|---|---|---|---|---|
| 9,722,446 | B2* | 8/2017 | Kwon | H02J 7/007 |
| 2012/0244822 | A1* | 9/2012 | Kim | H02J 5/005 |
| | | | | 455/90.1 |
| 2013/0181665 | A1* | 7/2013 | Lee | H02J 7/007 |
| | | | | 320/108 |
| 2014/0062213 | A1* | 3/2014 | Wheatley, III | H01F 38/14 |
| | | | | 307/104 |
| 2014/0062395 | A1 | 3/2014 | Kwon et al. | |
| 2014/0094116 | A1 | 4/2014 | Walley et al. | |
| 2014/0111153 | A1* | 4/2014 | Kwon | H02J 7/025 |
| | | | | 320/108 |
| 2014/0113689 | A1* | 4/2014 | Lee | H04W 52/0277 |
| | | | | 455/573 |
| 2014/0159653 | A1* | 6/2014 | Von Novak | H04B 5/0031 |
| | | | | 320/108 |
| 2014/0197785 | A1* | 7/2014 | Lee | H02J 7/025 |
| | | | | 320/108 |
| 2014/0253028 | A1* | 9/2014 | Lee | H02J 17/00 |
| | | | | 320/108 |
| 2014/0285143 | A1* | 9/2014 | Kwon | H02J 7/007 |
| | | | | 320/108 |
| 2014/0327319 | A1* | 11/2014 | Byun | H04W 76/023 |
| | | | | 307/104 |
| 2014/0327393 | A1* | 11/2014 | Lee | H02J 7/025 |
| | | | | 320/108 |
| 2014/0327409 | A1* | 11/2014 | Lee | H02J 7/025 |
| | | | | 320/137 |
| 2014/0333147 | A1* | 11/2014 | Lee | H02J 5/005 |
| | | | | 307/104 |
| 2014/0361738 | A1* | 12/2014 | Lee | H02J 7/025 |
| | | | | 320/108 |
| 2015/0054355 | A1* | 2/2015 | Ben-Shalom | H04B 5/0037 |
| | | | | 307/104 |
| 2015/0214775 | A1* | 7/2015 | Lee | H02J 7/025 |
| | | | | 320/137 |
| 2015/0256226 | A1* | 9/2015 | Lin | H04B 5/0037 |
| | | | | 307/104 |
| 2015/0382261 | A1* | 12/2015 | Kim | H04W 36/12 |
| | | | | 455/552.1 |
| 2016/0072340 | A1* | 3/2016 | Yoon | H05K 1/165 |
| | | | | 320/108 |
| 2016/0099604 | A1* | 4/2016 | Von Novak, III | H02J 7/025 |
| | | | | 320/108 |
| 2016/0197486 | A1* | 7/2016 | Von Novak, III | H02J 7/025 |
| | | | | 307/104 |
| 2016/0315481 | A1* | 10/2016 | Lee | H02J 7/025 |
| 2017/0302097 | A1* | 10/2017 | Kim | H02J 7/025 |
| 2017/0310124 | A1* | 10/2017 | Kwon | H02J 7/007 |
| 2017/0324279 | A1* | 11/2017 | Kang | H02J 50/80 |
| 2017/0373523 | A1* | 12/2017 | Kwon | H02J 7/025 |

FOREIGN PATENT DOCUMENTS

| | | |
|---|---|---|
| KR | 10-2014-0031783 A | 3/2014 |
| WO | WO 99/26364 A1 | 5/1999 |

* cited by examiner

WIRELESS CHARGING CONTROL METHOD, AND WIRELESS POWER TRANSMISSION APPARATUS AND WIRELESS POWER RECEIVING APPARATUS USING THE SAME

CROSS-REFERENCE TO RELATED APPLICATION(S)

This application claims the benefit of Korean Patent Application No. 10-2014-0180663 filed on Dec. 15, 2014 in the Korean Intellectual Property Office, the entire disclosure of which is incorporated herein by reference for all purposes.

BACKGROUND

1. Field

The following description relates to a wireless charging control method, and a wireless power transmission apparatus and a wireless power receiving apparatus using the same.

2. Description of Related Art

With the development of wireless technology, various wireless operations such as data transmissions and power transmissions have been enabled. A wireless charging technology capable of charging various portable apparatuses in a contactless manner has become a major issue.

The wireless charging technology needs to perform mutual recognition for transmission and reception between a wireless power transmission apparatus and a wireless power receiving apparatus. For example, when the wireless power receiving apparatus is adjacent to the wireless power transmission apparatus, power needs to be wirelessly transmitted after the adjacency of the apparatuses is confirmed.

However, when a plurality of wireless power transmission apparatuses are present, device recognition between the wireless power transmission apparatus and the wireless power receiving apparatus may be incorrect. The wireless charging may not occur or the performance of the wireless charging may deteriorate due to the crossed connection.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a wireless power transmission apparatus includes: a resonance circuit configured to be magnetically coupled to a wireless power receiving apparatus; a wireless communicator configured to form a near field communications channel with the wireless power receiving apparatus; and a cross controller configured to determine whether the wireless power receiving apparatus is cross-connected to the wireless power transmission apparatus based on first identification information received from the wireless power receiving apparatus through the resonance circuit and second identification information received from the wireless power receiving apparatus through the wireless communicator.

The cross controller may be configured to determine that the wireless power transmission apparatus is cross-connected to the wireless power receiving apparatus in response to the first identification information and the second identification information being different from each other.

The wireless power transmission apparatus may further include a power transmitter configured to control the resonance circuit to wirelessly supply power to the wireless power receiving apparatus.

The cross controller may be configured to control the power transmitter to wirelessly supply power to the wireless power receiving apparatus in response to it being determined that the wireless power receiving apparatus is not cross-connected to the wireless power transmission apparatus.

The power transmitter may be configured to control the resonance circuit to periodically transmit a short beacon signal, and determine that the wireless power receiving apparatus is positioned within a chargeable distance in response to impedance of the transmitted short beacon signal being changed.

The cross controller may be configured to control the resonance circuit to transmit an identification beacon signal requesting the first identification information to the wireless power receiving apparatus.

The cross controller may be configured to confirm the second identification information in an advertisement packet received from the wireless power receiving apparatus.

The power transmitter may be configured to control the resonance circuit to transmit a long beacon signal, and the wireless power transmission apparatus may be configured to receive the advertisement packet in response to the long beacon signal.

According to another general aspect, a wireless power receiving apparatus includes: a resonance circuit configured to be magnetically coupled to a wireless power transmission apparatus; a wireless communicator configured to form a near field communications channel with the wireless power transmission apparatus; and a controller configured to control the resonance circuit to supply first identification information to the wireless power transmission apparatus and control the wireless communicator to supply second identification information to the wireless power transmission apparatus.

The controller may be configured to generate an advertisement packet including the second identification information in response to receiving a long beacon signal from the wireless power transmission apparatus.

The controller may be configured to control the wireless communicator to supply the generated advertisement packet to the wireless power transmission apparatus via the near field communications channel.

The controller may be configured to control the resonance circuit to transmit the first identification information in response to receiving an identification beacon signal from the wireless power transmission apparatus.

The controller may be configured to wake up the wireless communicator in response to receiving the long beacon signal.

According to another general aspect, a wireless charging control method is performed by a wireless power transmission apparatus magnetically coupled to a wireless power receiving apparatus to supply power to the wireless power receiving apparatus in a contactless manner and setting a near field communications channel with the wireless power receiving apparatus. The wireless charging control method includes: periodically transmitting a short beacon signal; transmitting an identification beacon signal to the wireless power receiving apparatus in response to impedance of the short beacon signal being changed; confirming first identification information by receiving a response signal to the identification beacon signal; and receiving an advertisement packet from the wireless power receiving apparatus and confirming second identification information from the advertisement packet.

The wireless charging control method may further include determining that the wireless power receiving apparatus is cross-connected to the wireless power transmission apparatus in response to the first identification information and the second identification information being different from each other.

The wireless charging control method may further include wirelessly transmitting power by magnetically coupling the wireless power receiving apparatus with the wireless power transmission apparatus in response to it being determined that the wireless power receiving apparatus is not cross-connected to the wireless power transmission apparatus.

The confirming of the second identification information may include: transmitting a long beacon signal; and receiving the advertisement packet transmitted from the wireless power receiving apparatus in response to the long beacon signal.

The long beacon signal may be configured to wake up a wireless communicator of the wireless power receiving apparatus.

The advertisement packet may be transmitted via the near field communications channel.

Other features and aspects will be apparent from the following detailed description, the drawings, and the claims.

BRIEF DESCRIPTION OF THE DRAWINGS

The above and other aspects, features and other advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
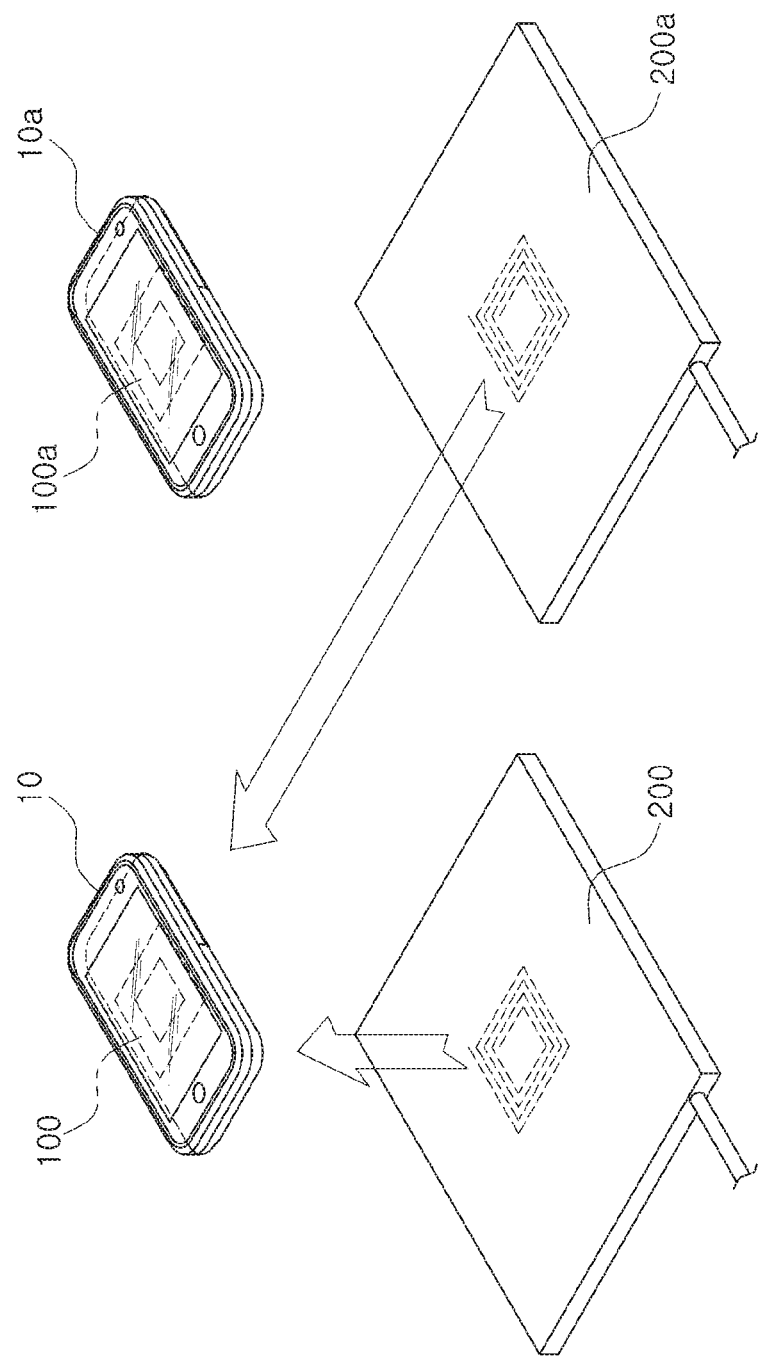
FIG. 1 is a diagram illustrating a cross-connection which may occur in an environment in which a plurality of wireless power transmission apparatuses are present.

FIG. 1 is a diagram illustrating a cross-connection which may occur in an environment in which wireless power transmission apparatuses 200 and 200a are present.

Referring to FIG. 1, wireless power transmission apparatuses 200 and 200a are connected to an external power source to wirelessly supply power to wireless power receiving apparatuses 100 and 100a. The wireless power receiving apparatuses 100 and 100a are configured to supply wireless power to a mobile terminal 10.

Meanwhile, the cross-connection may occur in an environment in which the wireless power transmission apparatuses 200 and 200a are provided and one or more of the wireless power receiving apparatuses 100 and 100a are present. "Cross-connection" means, for example, an incorrect connection between the wireless power transmission apparatus 200a and the wireless power receiving apparatus 100. For instance, when the wireless power receiving apparatus 100 is adjacent to the wireless power transmission apparatuses 200 and 200a, cross-connection for wireless power charging may occur. In the cross-connection, a connection is made between the wireless power transmission apparatus 200a and the wireless power receiving apparatus 100 which is not an actual charging target. When the cross-connection occurs, a problem in which the wireless power transmission apparatus 200a performs a standby operation before the wireless power receiving apparatus 100 is reset may occur.

Hereinafter, various embodiments capable of preventing the cross-connection will be described with reference to FIGS. 2 through 8.

Figure 2:
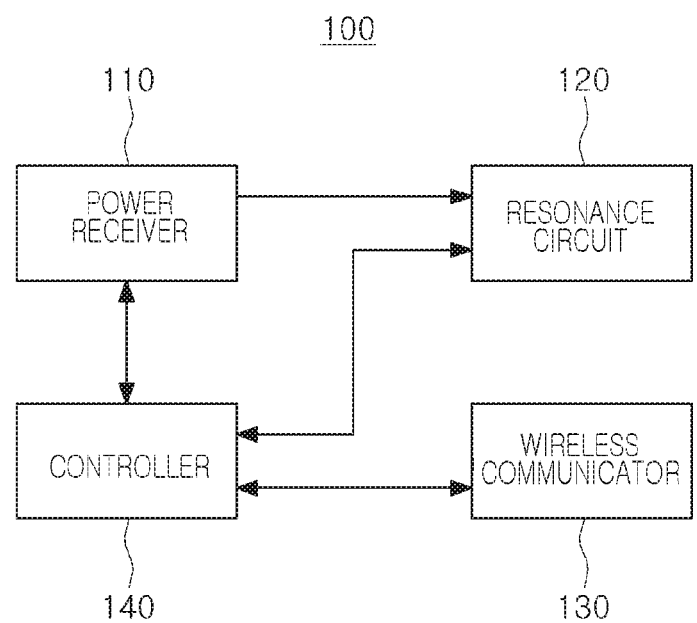
FIG. 2 is a block diagram illustrating an example of a wireless power receiving apparatus according to an embodiment.

FIG. 2 is a block diagram illustrating an example of a wireless power receiving apparatus according to an example embodiment.

Referring to FIG. 2, the wireless power receiving apparatus 100 includes a power receiver 110, a resonance circuit 120, a wireless communicator 130, and a controller 140.

The power receiver 110 is magnetically coupled to the wireless power transmission apparatus 200 using the resonance circuit 120 to wirelessly receive power. The power receiver 110 may be magnetically coupled to the wireless power transmission apparatus 200 in various schemes. For instance, the power receiver 110 according to the embodiment disclosed herein is not limited to a specific standard or a special scheme. For example, the power receiver 100 may use a magnetic resonance scheme or a magnetic induction scheme. As another example, the power receiver 110 may use at least one of various schemes such as a WPC scheme and an A4WP scheme or at least one of various standards.

The resonance circuit 120 can be magnetically coupled to the resonance circuit 220 of the wireless power transmission apparatus 200 to wirelessly receive power.

According to the disclosed embodiment, the resonance circuit 120 magnetically transmits a signal to and receives a signal from the wireless power transmission apparatus 200. For example, the resonance circuit 120 receives a beacon signal transmitted from the wireless power transmission apparatus 200. Further, the resonance circuit 120 transmits a response signal to the received beacon signal.

The wireless communicator 130 forms a near field communications channel with the wireless power transmission apparatus 200. For example, the wireless communicator 130 may form the near field communications channel with the wireless power transmission apparatus 200 using standards such as Bluetooth, Zigbee, and wireless LAN.

The controller 140 performs controlling to provide first identification information to the wireless power transmission apparatus 200 as a magnetic signal and provide the first identification information through a wireless communication channel.

The controller 140 controls the resonance circuit 120 to provide the first identification information to the wireless power transmission apparatus 200 and controls the wireless communicator 130 to provide second identification information to the wireless power transmission apparatus 200.

When receiving an identification beacon signal from the wireless power transmission apparatus 200 through the resonance circuit 120, the controller 140 controls the resonance circuit 120 to transmit the first identification information. The first identification information includes the identification information of the wireless power receiving apparatus 100 and is transmitted to the wireless power transmission apparatus 200 through the resonance circuit 120 as the magnetic signal.

When receiving a long beacon signal from the wireless power transmission apparatus 200 through the resonance circuit 120, the controller 140 generates an advertisement packet including the second identification information. The controller 140 controls the wireless communicator 130 to provide the advertisement packet to the wireless power transmission apparatus 200 via the near field communications channel.

The second identification information includes the identification information of the wireless power receiving apparatus 100 and is transmitted to the wireless power transmission apparatus 200 through the wireless communications channel through the wireless communicator 130 as a signal.

As described above, the first identification information and the second identification information are transmitted to the wireless power transmission apparatus 200 by different schemes, for instance, magnetic coupling and wireless communications, respectively, but the first identification information and the second identification information includes the same identification information of the wireless power receiving apparatus 100.

Therefore, the wireless power receiving apparatus 100 compares the first identification information with the second identification information to determine that the cross-connection does not occur when the first identification information and the second identification information include the same identification information.

Figure 3:
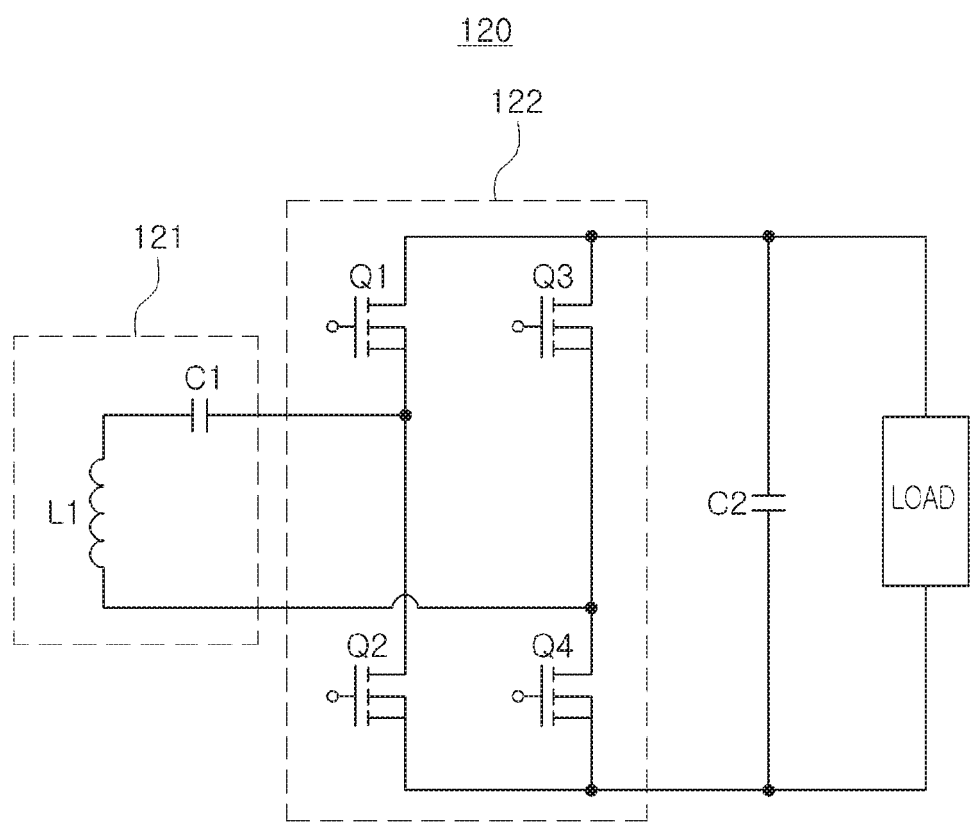
FIG. 3 is a circuit diagram illustrating an example of a resonance circuit of the wireless power receiving apparatus.

FIG. 3 is a circuit diagram illustrating an example of the resonance circuit 120 of the wireless power receiving apparatus 100.

Referring to FIG. 3, the resonance circuit 120 includes a resonance tank 121 and a switch circuit 122. The resonance tank 121 is magnetically coupled to the resonance tank 221 (FIG. 5) of the wireless power transmission apparatus 200. The switch circuit 122 includes switches Q1-Q4, and power transmitted through the resonance tank 121 may be charged by a switching operation of the switches Q1-Q4.

The power receiver 110, the wireless communicator 130, and the controller 140 of the wireless power receiving apparatus 100 may respectively be implemented as independent circuit components (for example, a processor, an integrated circuit such as ASIC, etc.), or all of these components may be implemented as a single circuit component.

Figure 4:
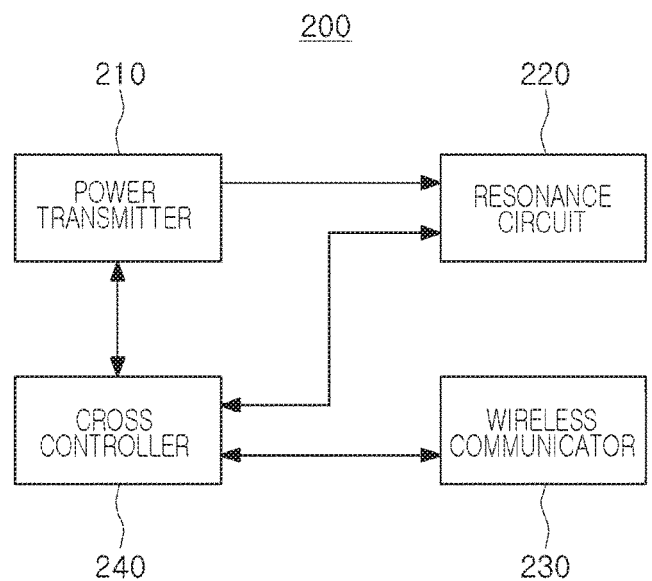
FIG. 4 is a block diagram illustrating an example of the wireless power transmission apparatus.

FIG. 4 is a block diagram illustrating an example of the wireless power transmission apparatus 200.

Referring to FIG. 4, the wireless power transmission apparatus 200 includes a power transmitter 210, the resonance circuit 220, a wireless communicator 230, and a cross controller 240.

The power transmitter 210 is magnetically coupled to the wireless power receiving apparatus 100 using the resonance circuit 220 to wirelessly transmit power. For instance, the power transmitter 210 controls the resonance circuit 220 to wirelessly provide power to the wireless power receiving apparatus 100.

The power transmitter 210 controls the resonance circuit 220 to periodically transmit a short beacon signal. When impedance of the transmitted short beacon signal is changed, the power transmitter 210 determines that the wireless power receiving apparatus 100 is positioned within a chargeable distance and controls the resonance circuit 220 to transmit the identification beacon signal.

The resonance circuit 220 is magnetically coupled to the wireless power receiving apparatus 100 to wirelessly transmit power.

The resonance circuit 220 magnetically transmits the signals to and receives the signals from the wireless power receiving apparatus 100. For example, the resonance circuit 220 transmits the beacon signal to the wireless power receiving apparatus 100. The beacon signal is the magnetic signal and is transmitted by the magnetic coupling with the wireless power receiving apparatus 100. The resonance circuit 220 confirms an impedance value of the short beacon signal.

The wireless communicator 230 forms the near field communications channel with the wireless power receiving apparatus 100. For example, the wireless communicator 230 forms the near field communications channel with the wireless power receiving apparatus 100 using standards such as Bluetooth, Zigbee, and wireless LAN.

The cross controller 240 determines whether the wireless power receiving apparatus 100 is a target of the cross-connection. More specifically, the cross controller 240 determines whether the wireless power receiving apparatus 100 is cross-connected to the wireless power transmission apparatus 200 based on the first identification information received from the wireless power receiving apparatus 100 using the magnetic coupling and the second identification information received from the wireless power receiving apparatus 100 using the near field communications channel. That is, the cross controller 240 determines whether the wireless power receiving apparatus is cross-connected to the wireless power transmission apparatus based on the first identification information received from the wireless power receiving apparatus 100 through the resonance circuit 230 and the second identification information received from the wireless power receiving apparatus 100 through the wireless communicator 230.

The cross controller 240 controls the resonance circuit 220 to transmit the identification beacon signal requesting the first identification information to the wireless power receiving apparatus 100. The cross controller 240 confirms the second identification information in the advertisement packet received from the wireless power receiving apparatus 100.

When the first identification information and the second identification information are different from each other, the cross controller 240 determines that the wireless power receiving apparatus 100 is cross-connected to the wireless power transmission apparatus 200. If it is determined that the wireless power receiving apparatus 100 is cross-connected to the wireless power transmission apparatus 200, the cross controller 240 controls the power transmitter 210 to not transmit power.

If it is determined that the wireless power receiving apparatus is not cross-connected to the wireless power transmission apparatus (e.g., the first identification information and the second identification information are the same as each other), the cross controller 240 controls the power transmitter 210 to supply wireless power to the wireless power receiving apparatus 100.

Figure 5:
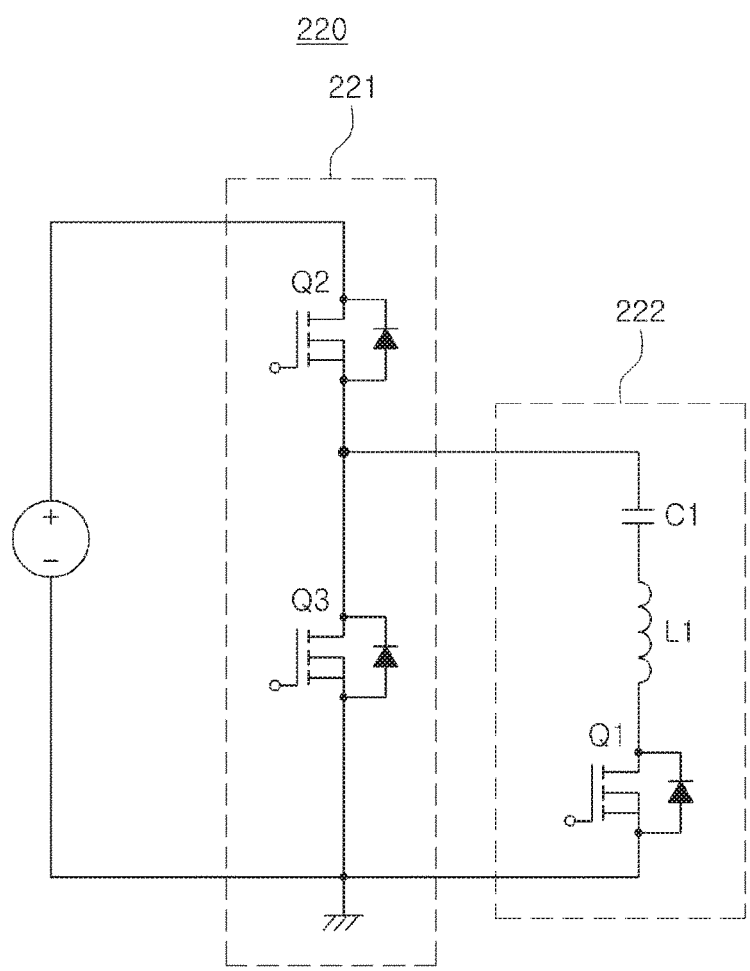
FIG. 5 is a circuit diagram illustrating an example of the resonance circuit of the wireless power receiving apparatus.

FIG. 5 is a circuit diagram illustrating an example of the resonance circuit 220 of the wireless power transmission apparatus 200.

Referring to FIG. 5, the resonance circuit 220 includes the resonance tank 221 and a switch circuit 222. The resonance tank 221 is magnetically coupled to the resonance tank 121 of the wireless power receiving apparatus 100. The switch circuit 222 includes switches Q1-Q3, and power is transmitted through the resonance tank 221 by a switching operation of the switches Q1-Q3.

FIG. 5 shows a circuit configuration of the resonance circuit 220. The power transmission unit 210, the wireless communicator 230, and the cross controller 240 of the wireless power transmission apparatus may respectively be implemented as independent circuit components (for example, a processor, an integrated circuit such as ASIC, etc.), or all of these components may be implemented as a single circuit component.

Figure 6:
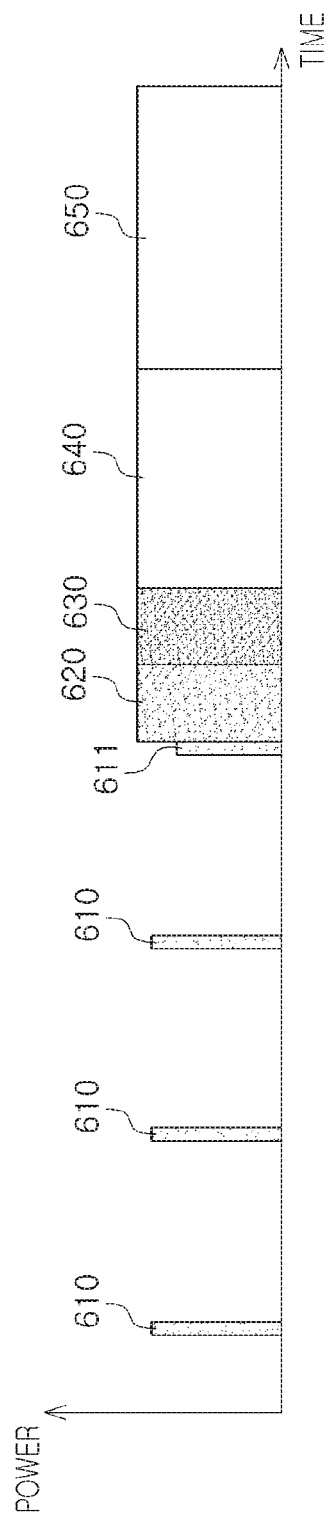
FIG. 6 is a graph illustrating various beacon signals transmitted for wireless charging.
Figure 7:
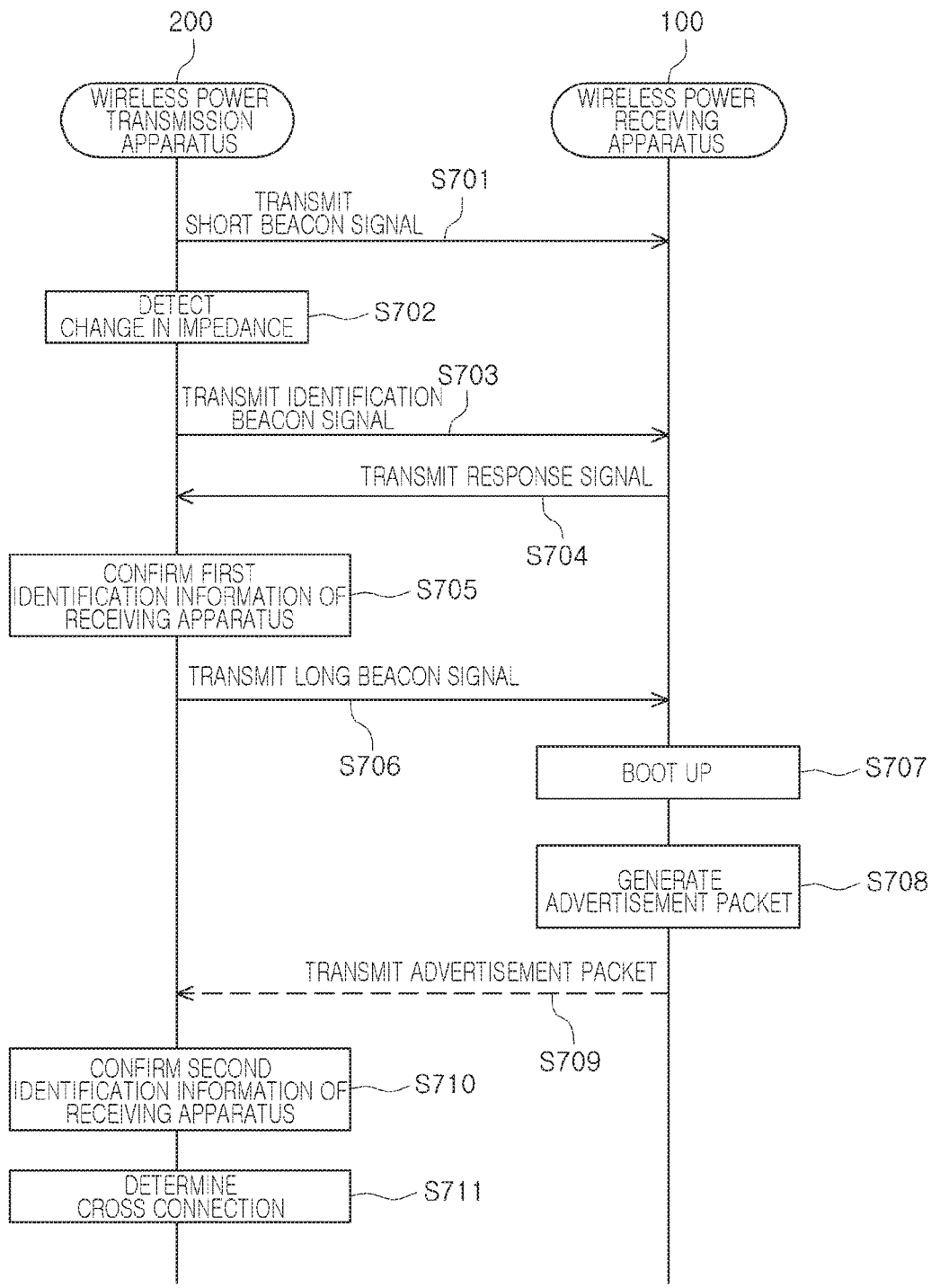
FIG. 7 is a flow chart illustrating an example of a wireless charging control method according to an embodiment.

FIG. 6 is a graph illustrating various example beacon signals transmitted for wireless charging, and FIG. 7 is a flow chart illustrating an example of a wireless charging control method according to an embodiment.

Referring to FIG. 6, a short beacon signal 610, an identification beacon signal 620, and a long beacon signal 630 are each a signal, such as a magnetic signal, transmitted to and received from the wireless power transmission apparatus 200 and the wireless power receiving apparatus 100 by the magnetic coupling therebetween. The short beacon signal 610 has less strength than that of the long beacon signal 630.

Referring to FIGS. 6 and 7, the wireless power transmission apparatus 200 periodically transmits the short beacon signal 610 in operation S701.

When the wireless power receiving apparatus 100 enters the chargeable range, the impedance value of the short beacon signal is changed, resulting in a changed short beacon signal 611. Therefore, when the change in the impedance value of the short beacon signal 611 is detected in operation S702, the wireless power transmission apparatus 200 begins to be ready to supply power.

In response to the impedance value of the short beacon signal 611 being changed, the wireless power transmission apparatus 200 transmits the identification beacon signal 620 in operation S703.

The wireless power receiving apparatus 100 receives the identification beacon signal 620 and then, in operation S704, transmits the first identification information including its identification information as a response signal to the identification beacon signal 620. Here, the response signal including the first identification information is also a magnetic signal.

In response to receiving the response signal to the identification beacon signal, the wireless power transmission apparatus 200 confirms the first identification information of the wireless power receiving apparatus 100 included in the response signal in operation S705.

Further in response to the impedance value of the short beacon signal 611 being changed, the wireless power transmission apparatus 200 also transmits a long beacon signal 630 in operation S706. The long beacon signal 630 functions to boot up some components of the wireless power receiving apparatus 100 in operation S707. For example, the long beacon signal 630 may wake up the wireless communicator 130 of the wireless power receiving apparatus 100.

The wireless power receiving apparatus 100 receives the long beacon signal 630, and then generates the advertisement packet as a response thereto in operation S708, and transmits the generated advertisement packet through the wireless communication channel in operation S709. The advertisement packet includes the information on the wireless power receiving apparatus 100 and includes the second identification information including the identification information of the wireless power receiving apparatus 100.

The wireless power transmission apparatus 200 receives the advertisement packet through the wireless communication channel, and confirms the second identification information of the wireless power receiving apparatus 100 included in the advertisement packet in operation S710. The wireless power transmission apparatus 200 determines, in operation S711, whether there is cross-connection based on the first identification information and the second identification information. If the wireless power transmission apparatus 200 is not cross-connected to the wireless power receiving apparatus 100, the wireless power transmission apparatus 200 registers, at registration 640, the wireless power receiving apparatus 100 and then wirelessly provides power 650.

Figure 8:
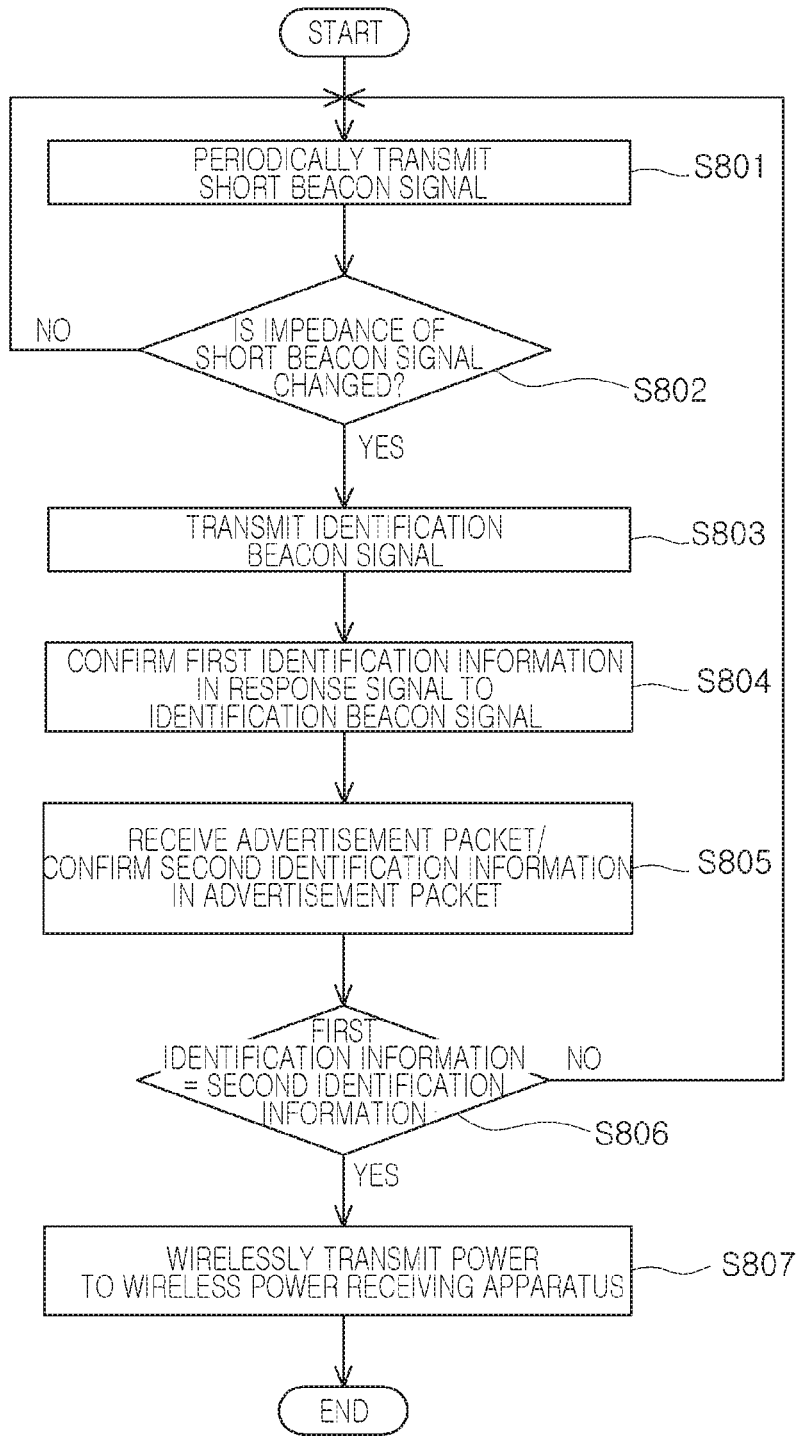
FIG. 8 is a flow chart illustrating a wireless power control method performed by a wireless power transmission apparatus according to an embodiment.

FIG. 8 is a flow chart illustrating a wireless power control method performed by the wireless power transmission apparatus 200.

The wireless power transmission apparatus 200 periodically transmits the short beacon signal in operation S801.

The wireless power transmission apparatus 200 determines whether the impedance of the short beacon signal is changed in operation S802. If it is determined that the impedance of the short beacon signal is not changed, the wireless power transmission apparatus 200 continuously, periodically transmits the short beacon signal. If it is determined that the impedance of the short beacon signal is changed, the wireless power transmission apparatus 200 transmits the identification beacon signal to the wireless power receiving apparatus 100 in operation S803.

The wireless power transmission apparatus 200 receives the response signal to the identification beacon signal, and confirms the first identification information in the response signal to the identification beacon signal in operation S804.

The wireless power transmission apparatus 200 receives the advertisement packet from the wireless power receiving apparatus 100, and confirms the second identification information in the advertisement packet in operation S805.

In operation S806, the wireless power transmission apparatus 200 determines whether the first identification information and the second identification information are identical. If the first identification information and the second identification information are different from each other, the wireless power transmission apparatus 200 determines that the wireless power receiving apparatus 100 is cross-connected to the wireless power transmission apparatus 200. If the first identification information and the second identification information are identical, the wireless power transmission apparatus 200 determines that the wireless power receiving apparatus 100 is not cross-connected to the wireless power transmission apparatus 200, and the wireless power transmission apparatus 200 is magnetically coupled to the wireless power receiving apparatus 100 to wirelessly transmit power in operation S807.

In one embodiment of step S805, the wireless power transmission apparatus 200 transmits the long beacon signal after confirming the first identification information, and then receives the advertisement packet transmitted from the wireless power receiving apparatus 100 in response to the long beacon signal. The advertisement packet is transmitted via the near field communications channel.

As set forth above, according to the embodiments disclosed herein, the accuracy of the wireless charging may be improved by accurately determining cross-connection at the time of the wireless charging.

The apparatuses, units, modules, devices, and other components (e.g., the power receiver 110, wireless communicator 130, controller 140, power transmitter 210, wireless communicator 230 and cross controller 240) illustrated in FIGS. 2 and 4 that perform the operations described herein with respect to FIGS. 6-8 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 6-8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 6-8 that perform the operations described herein with respect to FIGS. 1-5 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a mobile terminal as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmission apparatus comprising:
   a resonance circuit configured to be coupled to a wireless power receiving apparatus;
   a wireless communicator configured to form a communications channel with the wireless power receiving apparatus; and
   a cross controller configured to determine whether a cross-connection with the wireless power transmission apparatus is present based on an information comparison of first identification information received from the wireless power receiving apparatus through the resonance circuit and second identification information received through the wireless communicator.

2. The wireless power transmission apparatus of claim 1, wherein the cross controller is configured to determine the cross-connection to be present in response to the first identification information and the second identification information being different from each other.

3. The wireless power transmission apparatus of claim 1, further comprising a power transmitter configured to control the resonance circuit to wirelessly supply power to the wireless power receiving apparatus.

4. The wireless power transmission apparatus of claim 3, wherein the cross controller is configured to control the power transmitter to wirelessly supply power to the wireless power receiving apparatus in response to it being determined that the cross-connection is not present.

5. The wireless power transmission apparatus of claim 3, wherein the power transmitter is configured to control the resonance circuit to periodically transmit a short beacon signal, and determine that the wireless power receiving apparatus is positioned within a chargeable distance in response to impedance of the transmitted short beacon signal being changed.

6. The wireless power transmission apparatus of claim 1, wherein the cross controller is configured to control the resonance circuit to transmit the identification beacon signal requesting the first identification information to the wireless power receiving apparatus.

7. The wireless power transmission apparatus of claim 6, wherein the cross controller is configured to confirm the second identification information in an advertisement packet received from the wireless power receiving apparatus.

8. The wireless power transmission apparatus of claim 7, wherein:
   the power transmitter is configured to control the resonance circuit to transmit a long beacon signal; and
   the wireless power transmission apparatus is configured to receive the advertisement packet in response to the long beacon signal.

9. The wireless power transmission apparatus of claim 1, wherein the cross controller is configured to control the resonance circuit to transmit power to the wireless power receiving apparatus in response to the first identification information matching the second identification information.

10. A wireless power receiving apparatus comprising:
    a resonance circuit configured to be magnetically coupled to a wireless power transmission apparatus;
    a wireless communicator configured to form a near field communications channel with the wireless power transmission apparatus; and
    a controller configured to control the resonance circuit to supply first identification information including identification information of the wireless power receiving apparatus to the wireless power transmission apparatus, generate an advertisement packet including second identification information including the identification information of the wireless power receiving apparatus, in response to receiving a long beacon signal from the wireless power transmission apparatus, and control the wireless communicator to supply the generated advertisement packet to the wireless power transmission apparatus.

11. The wireless power receiving apparatus of claim 10, wherein the controller is configured to control the wireless communicator to supply the generated advertisement packet to the wireless power transmission apparatus via the near field communications channel.

12. The wireless power receiving apparatus of claim 10, wherein the controller is configured to control the resonance circuit to transmit the first identification information in response to receiving an identification beacon signal from the wireless power transmission apparatus.

13. The wireless power receiving apparatus of claim 10, wherein the controller is configured to wake up the wireless communicator in response to receiving the long beacon signal.

14. A wireless charging control method performed by a wireless power transmission apparatus magnetically coupled to a wireless power receiving apparatus to supply power to the wireless power receiving apparatus in a contactless manner and setting a near field communications channel with the wireless power receiving apparatus, the wireless charging control method comprising:
    periodically transmitting a short beacon signal;
    transmitting an identification beacon signal to the wireless power receiving apparatus in response to impedance of the short beacon signal being changed;
    confirming first identification information by receiving, by the magnetic coupling, a response signal to the identification beacon signal;
    receiving an advertisement packet from the wireless power receiving apparatus and confirming second identification information from the advertisement packet; and comparing information of the first identification information and the second identification information to determine whether the wireless power transmission apparatus is cross-connected.

15. The wireless charging control method of claim 14, further comprising determining that the wireless power receiving apparatus is cross-connected to the wireless power transmission apparatus in response to the first identification information and the second identification information being different from each other.

16. The wireless charging control method of claim 15, further comprising wirelessly transmitting power by magnetically coupling the wireless power receiving apparatus with the wireless power transmission apparatus in response to it being determined that the wireless power receiving apparatus is not cross-connected to the wireless power transmission apparatus.

17. The wireless charging control method of claim 15, wherein the confirming of the second identification information comprises:
   transmitting a long beacon signal; and
   receiving the advertisement packet transmitted from the wireless power receiving apparatus in response to the long beacon signal.

18. The wireless charging control method of claim 17, wherein the long beacon signal is configured to wake up a wireless communicator of the wireless power receiving apparatus.

19. The wireless charging control method of claim 15, wherein the advertisement packet is transmitted via the near field communications channel.

* * * * *